(12) United States Patent
Schatzl et al.

(10) Patent No.: US 11,294,806 B2
(45) Date of Patent: *Apr. 5, 2022

(54) FEEDBACK-BASED SELECTION OF REGIONS FOR ABORTABLE GARBAGE COLLECTION

(71) Applicant: Oracle International Corporation, Redwood Shores, CA (US)

(72) Inventors: Thomas Schatzl, Linz (AU); Nils Mikael Gerdin, Hagersten (SE); Erik Gustav Helin, Stockholm (SE)

(73) Assignee: Oracle International Corporation, Redwood Shores, CA (US)

( * ) Notice: Subject to any disclaimer, the term of this patent is extended or adjusted under 35 U.S.C. 154(b) by 198 days.

This patent is subject to a terminal disclaimer.

(21) Appl. No.: 16/526,212

(22) Filed: Jul. 30, 2019

(65) Prior Publication Data

US 2019/0354477 A1    Nov. 21, 2019

Related U.S. Application Data

(63) Continuation of application No. 15/041,794, filed on Feb. 11, 2016, now Pat. No. 10,417,125.

(51) Int. Cl.
*G06F 12/02* (2006.01)

(52) U.S. Cl.
CPC ......... *G06F 12/0269* (2013.01); *G06F 12/02* (2013.01); *G06F 12/0276* (2013.01); *G06F 2212/1016* (2013.01); *G06F 2212/702* (2013.01)

(58) Field of Classification Search
CPC ......... G06F 12/0246; G06F 2212/7205; G06F 12/0253; G06F 12/0269; G06F 12/0276;

(Continued)

(56) References Cited

U.S. PATENT DOCUMENTS 6,065,020 A    5/2000 Dussud
7,293,051 B1   11/2007 Printezis et al.
(Continued)

OTHER PUBLICATIONS

Andrew Cheadle, "Soft Real-time Garbage Collection for Dynamic Dispatch Languages", University of London, http://www.doc.ic.ac.uk/-amc4/papers/thesis.pdf, downloaded Mar. 26, 2018.

(Continued)

*Primary Examiner* — Sanjiv Shah
*Assistant Examiner* — Edward Waddy, Jr.
(74) *Attorney, Agent, or Firm* — Invoke

(57) ABSTRACT

The disclosed embodiments provide a method, apparatus, and system for selecting, based on feedback from previous garbage collections, a portion of a referenced memory area for garbage collection within a time window. During the execution of a software program, the system selects a given portion of a referenced memory area on which garbage collection can be completed within the given time window and attempts to complete garbage collection on at least the given portion of the referenced memory area before the end of the given time window. Next, the system selects, based on the results of the garbage collection performed during the given time window, a subsequent portion of the referenced memory area on which garbage collection can be completed within the subsequent time window and attempts to complete garbage collection on at least the subsequent portion of the referenced memory area before the end of the subsequent time window.

20 Claims, 13 Drawing Sheets

(58) Field of Classification Search
CPC . G06F 2212/702; G06F 12/023; G06F 16/215
USPC ....... 711/103, 12.008, 159, 12.009, 133, 166
See application file for complete search history.

(56) References Cited

U.S. PATENT DOCUMENTS

| | | | |
|---|---|---|---|
| 7,774,389 | B2 | 8/2010 | Stephens et al. |
| 8,261,269 | B2 | 9/2012 | Garmark |
| 8,688,754 | B1 | 4/2014 | Burka et al. |
| 8,788,778 | B1 | 7/2014 | Boyle |
| 8,856,186 | B1 | 10/2014 | Li et al. |
| 9,727,456 | B2 | 8/2017 | Malwankar et al. |
| 9,740,716 | B2 | 8/2017 | Wilhelmsson |
| 9,971,683 | B1 * | 5/2018 | Bell .................... H04L 67/1095 |
| 2005/0160416 | A1 | 7/2005 | Jamison |
| 2007/0016633 | A1 | 1/2007 | Lindholm et al. |
| 2008/0034175 | A1 * | 2/2008 | Traister ............... G06F 12/0246 711/159 |
| 2008/0086619 | A1 | 4/2008 | Traister et al. |
| 2008/0140737 | A1 | 6/2008 | Garst et al. |
| 2008/0162787 | A1 | 7/2008 | Tomlin et al. |
| 2009/0158288 | A1 | 6/2009 | Fulton et al. |
| 2009/0307292 | A1 | 12/2009 | Li et al. |
| 2009/0319720 | A1 | 12/2009 | Stefanus et al. |
| 2010/0011357 | A1 | 1/2010 | Ramamurthy |
| 2010/0254254 | A1 | 10/2010 | Chan et al. |
| 2010/0287350 | A1 | 11/2010 | Ylonen |
| 2014/0101372 | A1 | 4/2014 | Jung et al. |
| 2014/0359201 | A1 | 12/2014 | Chakrabarti |
| 2015/0058381 | A1 | 2/2015 | Wilhelmsson |
| 2015/0100752 | A1 * | 4/2015 | Flood .................. G06F 12/0269 711/171 |
| 2016/0239413 | A1 | 8/2016 | Stephens et al. |
| 2016/0350214 | A1 | 12/2016 | Payer et al. |

OTHER PUBLICATIONS

Mohamed A. El-Zawawy, "Recognition of Logically Related Regions Based Heap Abstraction", Journal of the Egyptian Mathematical Society, vol. 20, Issue 2, Jul. 2012, pp. 64-71, arXiv:1212.5094 [cs.LO].

Ryan Sciampacone et al, "Garbage collection in WebSphere Application Server V8, Part 2: Balanced garbage collection as a new option", IBM developerWorks, Aug. 3, 2011.

* cited by examiner

FEEDBACK-BASED SELECTION OF REGIONS FOR ABORTABLE GARBAGE COLLECTION

INCORPORATION BY REFERENCE; DISCLAIMER

The following application is hereby incorporated by reference: application Ser. No. 15/041,794 filed on Feb. 11, 2016. The Applicant hereby rescinds any disclaimer of claim scope in the parent application(s) or the prosecution history thereof and advises the USPTO that the claims in this application may be broader than any claim in the parent application(s).

FIELD

The disclosed embodiments relate to techniques for performing garbage collection operations to facilitate the execution of a software program. More specifically, the disclosed embodiments relate to techniques for selecting one or more regions of memory for incremental garbage collection.

RELATED ART

During the execution of a software program, one or more threads of the software program may dynamically allocate memory on the heap to store objects used by the software program. The execution environment of the software program often provides automatic memory management in the form of a garbage collection system. More specifically, a garbage collector may automatically reclaim memory from dead objects on the heap on behalf of the software program, thereby freeing the software program from having to clean up the heap itself.

However, to avoid jeopardizing the integrity of the software program's state, the garbage collector may pause all threads of the software program while reclaiming memory from the heap. If these pauses in the software program's execution run too long, they may degrade a user's experience of the software program. On the other hand, if the pauses are too short, garbage collection throughput may be disproportionately reduced. Hence, what is needed is a garbage collector implementation that retains garbage collection throughput during stop-the-world events that are short enough to avoid affecting the software program's usability.

SUMMARY

The disclosed embodiments provide a method, apparatus, and system for selecting, based on feedback from previous garbage collections, a portion of a referenced memory area for garbage collection within a time window.

During the execution of a software program, based at least in part on determining that the software program is paused for a given time window while garbage collection is being performed on a referenced memory area of the software program, the system: (1) selects a given portion of the referenced memory area on which garbage collection can be completed within the given time window; and (2) attempts to complete garbage collection on at least the given portion of the referenced memory area before the end of the given time window. Next, based at least in part on determining that the software program is paused for a subsequent time window while garbage collection is being performed on the referenced memory area, the system: (1) selects, based at least in part on the results of the garbage collection performed during the given time window, a subsequent portion of the referenced memory area on which garbage collection can be completed within the subsequent time window; and (2) attempts to complete garbage collection on at least the subsequent portion of the referenced memory area before the end of the subsequent time window.

In some embodiments, the referenced memory area includes a heap.

In some embodiments, the given portion of the referenced memory area includes a given set of regions within the heap on which garbage collection can be completed within the given time window.

In some embodiments, the subsequent portion of the referenced area includes a subsequent set of regions within the heap on which garbage collection can be completed within the subsequent time window.

In some embodiments, attempting to complete garbage collection on at least an estimated portion of the referenced memory area before the end of a time window includes the following steps. Initially, the system performs garbage collection on the portion of the referenced memory. Next, while the time window has not ended, the system determines a remaining amount of time left in the time window and selects, based at least in part on the results of the garbage collection performed on the estimated portion of the referenced memory, another portion of the referenced memory on which garbage collection can be completed within the remaining amount of time.

In some embodiments, attempting to complete garbage collection on at least an estimated portion of the referenced memory area before the end of a time window includes aborting the garbage collection on the estimated portion of the referenced memory area if garbage collection on the portion of the referenced memory area is not completed by the end of the time window.

In some embodiments, selecting a portion of the referenced memory area on which garbage collection can be completed within a time window is based at least in part on at least one of:
  (i) the results of one or more previous garbage collections; and
  (ii) the results of a previous part of a current garbage collection.

In some embodiments, the results of a previous garbage collection performed during a time window include information on at least one of:
  (i) whether the previous garbage collection was aborted;
  (ii) an amount of time taken to abort the previous garbage collection;
  (iii) a remaining amount of time left in the time window after performing the previous garbage collection;
  (iv) a number of objects collected during the previous garbage collection; and
  (v) an average amount of time taken to copy an object during the previous garbage collection.

In some embodiments, previous garbage collection abortions cause the estimation to be more conservative and previous successful garbage collection completions cause the estimation to be less conservative.

In some embodiments, the estimation is further based at least in part on data provided by a user of the software program.

In some embodiments, each of the time windows is based at least in part on a specified maximum time length that the software program can be paused during the software program's execution.

As described herein, first, second, third, and other ordinal adjectives are naming conventions that are not necessarily indicative of order unless otherwise functionally required.

BRIEF DESCRIPTION OF THE FIGURES

In the figures, like reference numerals refer to the same figure elements.

DETAILED DESCRIPTION

Figure 1:
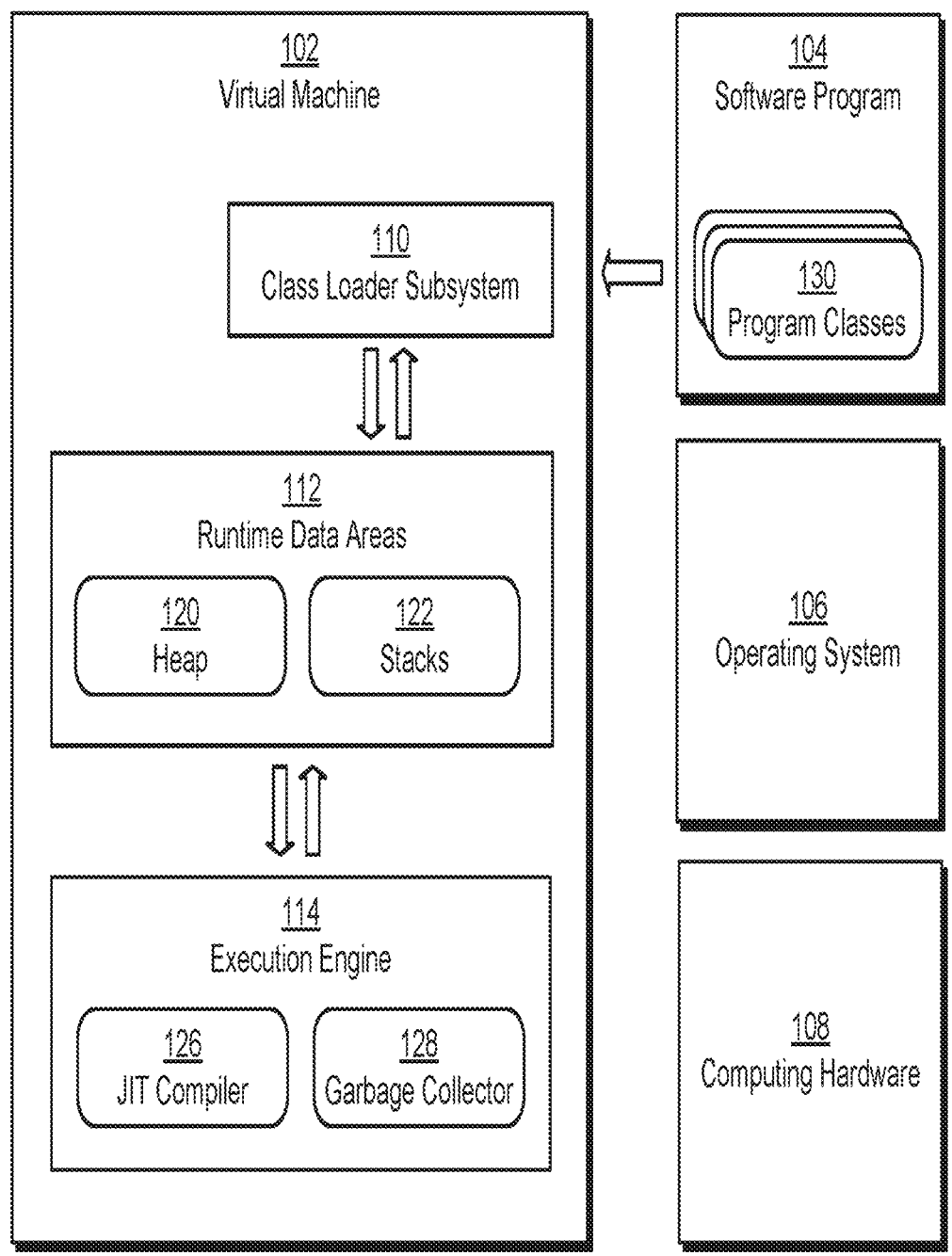
FIG. 1 shows a diagram of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method, apparatus, and system for facilitating garbage collection within a referenced memory area that is used by a software program. During the execution of the software program, the results of one or more garbage collections may be recorded. These results may later be used as feedback when selecting a portion of the referenced memory area on which garbage collection is to be completed within a time window.

More specifically, the disclosed embodiments provide a garbage collector implementation that is (1) incremental, (2) abortable, and (3) capable of using feedback from past garbage collections, user provided input, and other data to more accurately estimate a number of regions within a heap that can be garbage collected within a stop-the-world event, wherein the event is constrained by a maximum time length.

In general, a software program may rely on a garbage collector provided by the execution environment to reclaim heap memory from dead objects that were previously allocated by the software program. To avoid jeopardizing the integrity of the software program's state (e.g., by accidentally collecting live objects), the garbage collector may pause all (mutator) threads of the software program while reclaiming memory from the heap. Known as a stop-the-world event, this pause in execution may degrade the software program's usability if it runs too long, especially if latency is a concern. The necessity of pausing all mutator threads of a software program during a garbage collection is especially problematic when dealing with large heaps (e.g., 50 gigabytes (GB) or more) because the time to process the entire heap grows along with the heap's size.

The impact of stop-the-world events may be mitigated through the use of an incremental garbage collector that is capable of performing a garbage collection on a portion of the heap (i.e., perform an incremental garbage collection). Here, the portion of the heap that is selected for garbage collection (e.g., the collection set) may correspond to one or more regions of the heap. While the incremental garbage collector may still impose stop-the-world events, the length of one or more of these events may no longer directly correspond with the size of the heap. Instead, the incremental garbage collector may limit the duration of the stop-the-world events to less than a maximum time length (that may be provided by the user of the software program) and attempt to garbage collect (i.e., process) different portions of the heap during each of those durations.

In general, incremental garbage collectors do not know how long it will take to process a region of the heap. Thus, if an incremental garbage collector selects a collection set that is too large to process within a given stop-the-world event, the garbage collector may have to stop and/or abort the garbage collection of the set when time runs out, which may be costly and/or unsafe. To avoid this scenario, some incremental garbage collectors may: (1) select smaller collection sets; and/or (2) constantly check how much time is left in a stop-the-world event as it processes a collection set. However, adopting these strategies may result in reduced garbage collection throughput. The disclosed embodiments provide an incremental abortable garbage collector that is capable of using feedback from past garbage collections to more accurately estimate a number of regions that it can process within a stop-the-world event of a given duration, thereby improving the software program's user experience while preserving garbage collection throughput.

During the operation of a software program, one or more (mutator) threads of a garbage collector may be halted while one or more of the software program's threads continue to execute within a host environment. When a stop-the-world event occurs, the garbage collector may initially determine the length of the stop-the-world event. Once it determines how much time it has to garbage collect, the garbage collector may estimate the highest number of regions of the heap (e.g., 10 regions) on which garbage collection can be completed within the stop-the-world event. In making the estimate, the garbage collector may use one or more heuristics and/or algorithms that accept data from various sources including (1) previous garbage collection results, (2) data provided by the user, and/or (3) one or more characteristics of the host environment. The garbage collector may then select a collection set with a size that is equal to the estimated number of regions and attempt to complete garbage collection on the collection set before the end of the stop-the-world event. If the garbage collector is unable to process the entire collection set by the end of the stop-the-world event, the garbage collector may abort the garbage collection and record the aborted garbage collection attempt for future reference. Here, the aborted garbage collection attempt may cause the garbage collector to make a more conservative estimate during a future stop-the-world event.

On the other hand, if the garbage collector processes the entire collection prior to the end of the stop-the-world event, the garbage collector may record the successful garbage collection for future reference, which may cause the garbage collector to make a less conservative estimate in a future stop-the-world event. Additionally, if there is enough time remaining, the garbage collector may attempt to estimate, select, and/or process one or more additional smaller collection sets before the end of stop-the-world event.

Once the stop-the-world event finishes, the garbage collector's threads halt while the software program's threads resume execution. Once the next stop-the-world event is imposed on the software program, the garbage collector may feed the results of the previous garbage collection into the one or more heuristics and/or algorithms to more accurately estimate the highest number of regions of the heap on which garbage collection can be completed within the latest stop-the-world event.

It should be noted that in some embodiments, the garbage collector may estimate at the object level rather than the region level. More specifically, during a stop-the-world event, the garbage collector may determine the highest number of objects (e.g., 10,000 objects) that can be collected within the stop-the-world event instead of the highest number of regions. This particular variation may be advantageous in situations where more granularity with regards to incremental garbage collection is desired.

FIG. 1 shows a diagram of a system in accordance in with the disclosed embodiments. As shown in FIG. 1, software program 104 may execute on virtual machine 102. Virtual machine 102 may execute on top of operating system 106 and/or computing hardware 108, all of which are contained within host environment 100 of the host system. More specifically, during software program 104's execution, program classes 130 of software program 104 may be loaded by class loader subsystem 110 into runtime data areas 112. Additionally, one or more components of execution engine 114 may operate on data present in runtime data areas 112. These components may include Just-in-Time (JIT) compiler 126 and garbage collector 128.

Host environment 100 may correspond to a stack of one or more software components that execute on computing hardware 108, which may correspond to a smartphone, a cell phone, a personal digital assistant (PDA), a laptop computer, a desktop computer, a tablet computer, a server, a cluster of servers, a hypervisor, a container, or an embedded system.

Software program 104 may be an application that executes on an operating system, an embedded application that executes on firmware, an enterprise application, a database, a shared library, a device driver, and/or any other type of software program. Software program 104 may be written in a high-level programming language that can be compiled into an intermediate code via a compiler. Additionally, software program 104, in its intermediate code form, may be configured to execute on virtual machine 102. For example, software program 104 may be written in the Java programming language; virtual machine 102 may follow the Java Virtual Machine (JVM) specification; and software program 104 may be compiled into Java byte code, which may be executed on any software environment that includes a JVM. Additionally, software program 104 may be composed of one or more classes that specifically implement functionality of the software program, which are represented by program classes 130. For example, program classes 130 may each correspond to a class written in a high-level programming language (e.g., Java) that has been compiled to an intermediate code (e.g., Java byte code).

Virtual machine 102 may correspond to any virtual machine that provides one or more data areas for storing software program 104 in its intermediate code form at runtime and an interpreter and/or a just-in-time (JIT) compiler for executing the loaded intermediate code. A virtual machine may be referred to as a software implementation of a machine that executes programs like a physical machine. Examples of JVM implementations include Oracle Hotspot JVM and International Business Machines (IBM) JVM. In particular, virtual machine 102 may include class loader subsystem 110, runtime data areas 112, and execution engine 114.

Class loader subsystem 110 may correspond to a component of virtual machine 102 that handles the loading of program classes 130, which have been compiled into intermediate code, into one or more data areas of the virtual machine at runtime.

Runtime data areas 112 may correspond to one or more referenced memory areas organized by virtual machine 102 to hold the intermediate code of software program 104 and the data it operates upon during execution. In particular, the runtime data areas provided by virtual machine 102 to execute software program 104 may include heap 120 and stacks 122. In cases where software program 104 is multi-threaded, some components of runtime data areas 112 are shared among all threads while others are unique to individual threads. One stack exists for each thread. The stack is created when the thread starts. Thus, stacks 122 may refer to all stacks created and assigned to the threads of software program 104. A thread's stack may store the state of one or more current method invocations for the thread in one or more stack frames. A stack frame is created and pushed onto a thread's stack when a method is executed in virtual machine 102 by the thread. When the method finishes, the stack frame is popped off the stack. In particular, a stack frame contains one or more components of the method's state, which may include one or more local variables, one or more parameters with which the method was invoked, one or more return values, and intermediate calculations. Some local variables and/or parameters may hold primitive data values, which are stored in the stack frame. Other local variables and/or parameters may hold references to objects, which are created and stored on heap 120. Thus, object references stored in all stack frames of all stacks for a software program may be referred to as the "root set" of the software program. In some embodiments, the root set may additionally include any object references, such as strings, in a constant pool of loaded classes. The constant pool of a loaded class may refer to strings stored on the heap, such as the class name, superclass name, superinterface names, field names, field signatures, method names, and method signatures.

Heap 120 may correspond to a heap, which is a referenced memory area that stores objects created during the execution of a software program. Unlike stacks, however, a heap may be shared by all threads. Whenever a thread creates an object, the object is stored in a portion of memory allocated on the heap while a reference to the object is created and stored in the current stack frame of the thread. This reference to the object may be passed from method to method within the thread and even shared among multiple threads within their stack frames. Threads may then use these references to access the object and modify the object on the heap. Additionally, other objects that are allocated on the heap may possess references to the object. So long as the object is reachable from the software program's root set (e.g., directly by a thread through a reference stored on its stack, or indirectly through one or more other objects on the heap), the object is known as a live object (i.e., an object with liveness). Objects that are unreachable from the software program are considered garbage and are the target of garbage collection. Heaps are discussed in further detail below with respect to FIGS. 2-3.

Execution engine 114 may correspond to a component of virtual machine 102 that executes the intermediate code, which is loaded into runtime data areas 112 by class loader subsystem 110. In particular, the execution engine may employ JIT compiler 126 to periodically compile portions of the intermediate code into native code, which is then directly executed by execution engine 114. Additionally, execution engine 114 may provide garbage collector 128.

Garbage collector 128 may correspond to an incremental garbage collector used by execution engine 114 to manage memory in heap 120 during the execution of software program 104. Functions performed by garbage collectors may include: (1) automatically clearing garbage (i.e., unreachable objects) from the heap; and (2) moving objects between sections of the heap to reduce heap fragmentation. A software program may constantly create and store objects in heap memory. Garbage collectors may prevent the heap from running out of memory by automatically reclaiming objects that are unreachable from the software program's root set. Additionally, free space within the heap may become fragmented due to objects being allocated and reclaimed at various locations throughout the heap. To help ensure that the heap can provide large contiguous blocks of memory with which to store larger objects of the software program, the garbage collector may periodically compact all live objects into alternate sections of the heap, thereby combining small pockets of free heap space into larger ones. To accomplish these tasks more efficiently, the garbage collector may conceptually divide the heap into (1) multiple generations, and into (2) multiple regions, as discussed in further detail below with respect to FIGS. 2-3.

Figure 2:
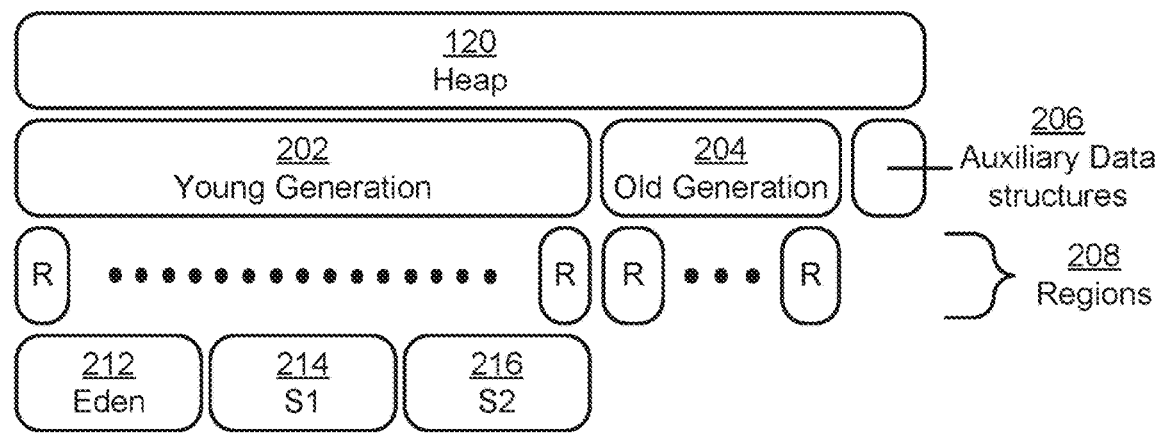
FIG. 2 shows a conceptual division of a heap into multiple parts in accordance with the disclosed embodiments.
Figure 3:
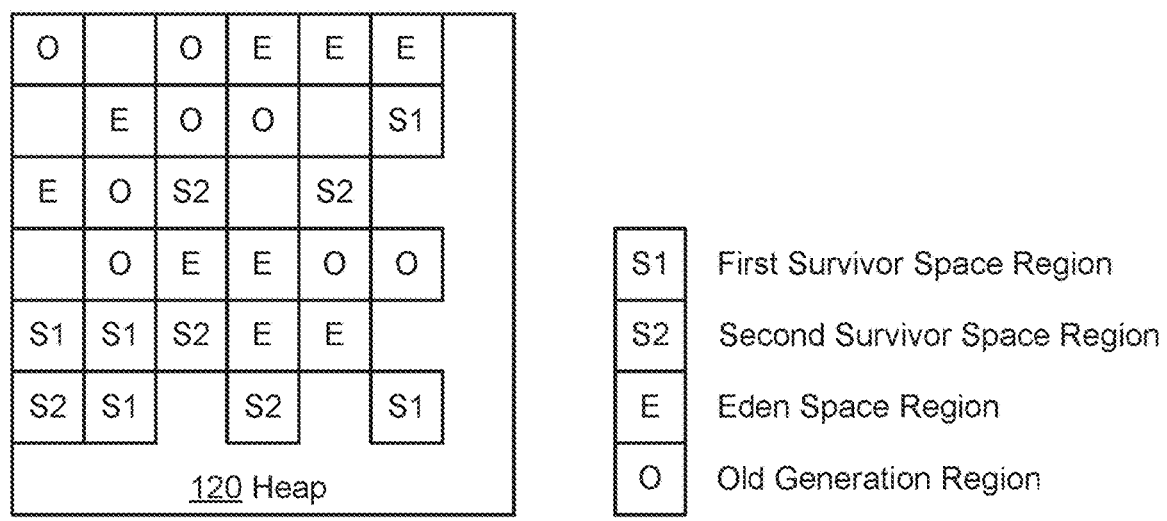
FIG. 3 shows a conceptual division of a heap into multiple parts in accordance with the disclosed embodiments.

FIGS. 2-3 both show conceptual divisions of a heap into multiple parts in accordance with the disclosed embodiments. More specifically. FIG. 2 displays how a garbage collector may conceptually divide a heap into multiple generations so that dead objects can be collected more efficiently. FIG. 3 displays how the garbage collector may also divide a heap into multiple regions, wherein each region is assigned to one of the generations.

Garbage collector 128 may execute via one or more threads that operate on data stored in runtime data areas 112. To perform certain tasks, garbage collector 128 may invoke one or more stop-the-world events during the duration of software program 104's execution. During a stop-the-world event, all (mutator) threads of software program 104 are paused, allowing threads of garbage collector 128 to complete tasks that cannot be interrupted without risking the integrity of the software program's runtime state. If the heap is large, stop-the-world events can halt a software program for seconds, which can affect the usability of the software program. Thus, garbage collector 128 may divide heap 120 into multiple generations, which include young generation 202 and old generation 204. Young generation 202 may correspond to a part of heap 120 that stores young objects, while old generation 204 may correspond to another part of the heap that stores old (tenured) objects. In particular, the "age" of an object refers to the number of garbage collections the object has survived.

Because objects that have survived a threshold number of garbage collections (i.e., older objects) are less likely to yield free space during future garbage collections, garbage collector 128 may: (1) keep old objects in old generation 204 and young objects in young generation 202; and (2) perform garbage collections more frequently on young generation 202 (i.e., perform an incremental garbage collection with young generation 202 as the collection set) and performing garbage collections less frequently on old generation 204. In some embodiments, a general garbage collector may divide heap 120 into any number of generations.

Young generation 202 may be further divided into the following parts: Eden space 212, first survivor space 214, and second survivor space 216. Newly created objects may initially be stored in Eden space 212. During an incremental garbage collection, garbage collector 128 may move living objects from Eden space 212 and first survivor space 214 into second survivor space 216 and clear spaces 212-214 of garbage. During a subsequent incremental garbage collection, garbage collector 128 may move living objects from Eden space 212 and second survivor space 216 back into first survivor space 214, before clearing spaces 212 and 216 of garbage.

To more efficiently conduct garbage collection over heap 120, garbage collector 128 may divide heap 120 into a plurality of equally sized regions (regions 208) and assign each region to either young generation 202 or old generation 204. For example, a 50 GB heap may be subdivided into a number of 32 MB (megabyte) regions. As shown in FIG. 3, part of heap 120 may be allocated to form a plurality of regions, while the rest of the heap may exist as free space from which new regions may be allocated on demand. In particular, Eden space 212 may be composed of the regions that contain an 'E', first survivor space 214 may be composed of the regions that contain "S1", second survivor space 216 may be composed of the regions that contain "S2", and old generation 204 may be composed of the regions that contain an 'O'.

To preserve the runtime state of software program 104 during each incremental garbage collection, garbage collector 128 may move and/or copy out all living objects within a region prior to garbage collecting that region. Living objects may include objects that garbage collector 128 can reach by following one or more references from software program 104's root set. After moving and/or copying out these objects, garbage collector 128 then garbage collects all other objects within the collection set.

It should also be noted that garbage collector 128 may allocate memory from heap 120 to store auxiliary data structures 206, which may include one or more remembered sets. Although FIG. 2 depicts auxiliary data structures 206 as being stored in a separate part of the heap, other ways of organizing the auxiliary data structures in heap 120 may be used (e.g., storing remembered sets within each region of the heap).

FIGS. 4A-4F show a number of successful garbage collections in accordance with the disclosed embodiments. More specifically FIGS. 4A-4F illustrate a number of interactions between a garbage collector and the heap while the garbage collector attempts to process a number of regions of the heap during a time window provided by a stop-the-world event.

Figure 4A:
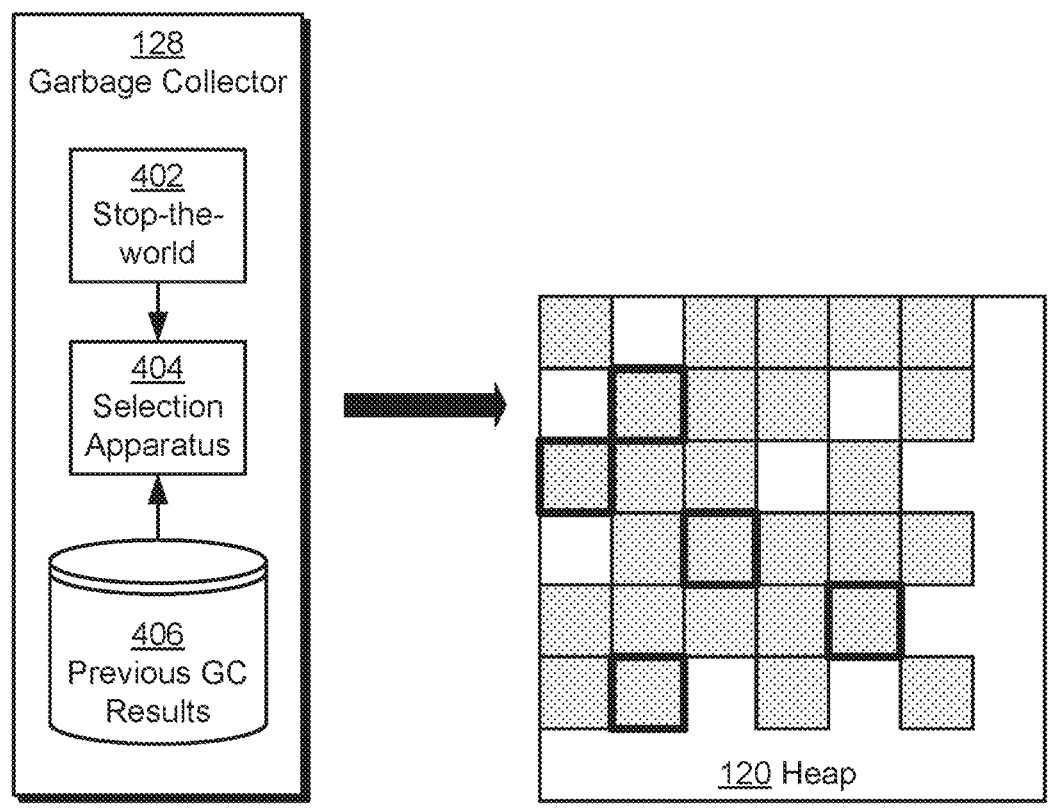
FIGS. 4A-4F show successful garbage collections in accordance with the disclosed embodiments.
Figure 4A:
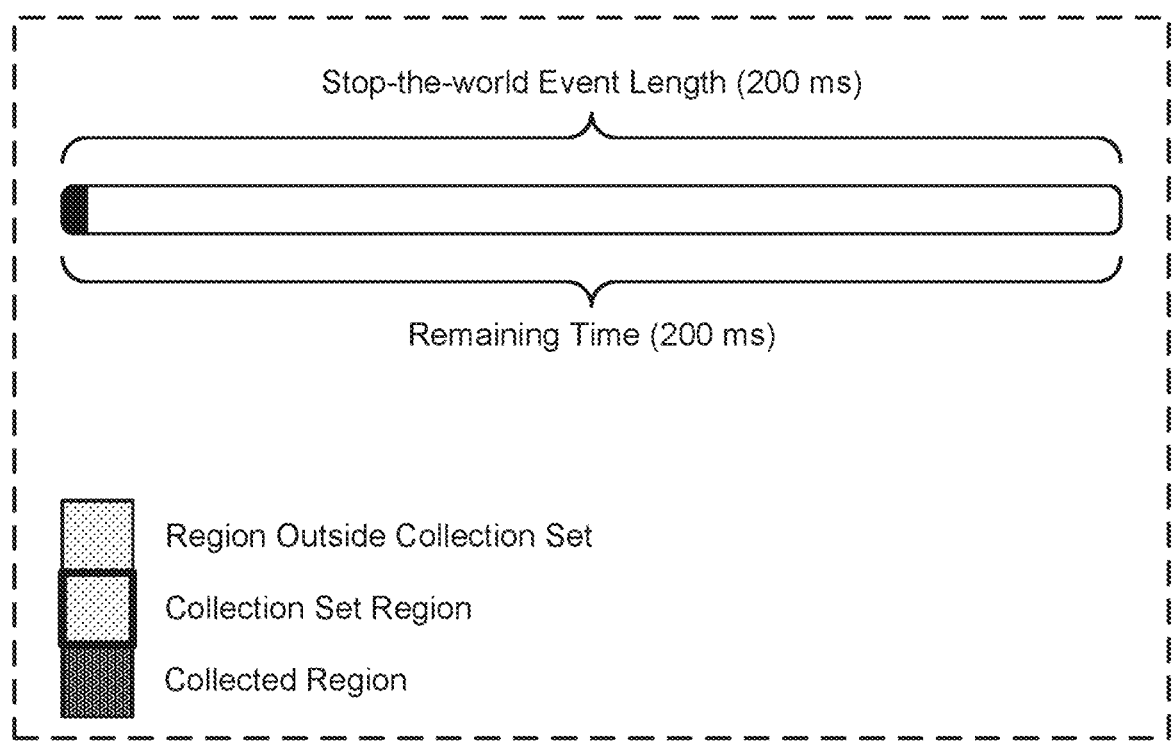

FIG. 4A shows selection apparatus 404, which may be included within garbage collector 128, selecting regions within heap 120 at the beginning of stop-the-world event 402. In particular, the selection apparatus receives a number of input parameters, including the stop-the-world event's length and previous garbage collection results 406.

Stop-the-world event 402 may be imposed on software program 104 in response to garbage collector 128 determining that free space within heap 120 has reached or gone below a particular threshold. Depending on the state of the heap, the stop-the-world event may be part of a young generation garbage collection or an old (mixed) generation garbage collection.

Previous garbage collection results 406 may include the results of one or more garbage collections that were previously attempted on heap 120. Some of these past garbage collections may be successful garbage collections. A successful garbage collection may correspond to an event where the garbage collector succeeds in processing, within the time window provided by the stop-the-world event, the regions that were selected by the selection apparatus. Some of these garbage collections may have been aborted. An aborted garbage collection may correspond to an event where the garbage collector is not able to process, within the time window provided by the stop-the-world event, all regions that were selected in that garbage collection and has to abort the garbage collection. In some embodiments, previous garbage collection results 406 may be stored within any type of data structure such as an array and/or a linked list. In some embodiments, the results may be stored within a database and/or an external file.

Results for a given garbage collection may include (1) information on whether the garbage collection was successful or aborted, (2) (if aborted) the amount of time it took to abort the garbage collection, (3) (if successful) the amount of time it took to perform the garbage collection. (4) the amount of time remaining in the stop-the-world event after the garbage collection was completed, (5) the number of regions in the collection set, (6) the total number of objects marked during the garbage collection, (7) the total number of objects collected during the garbage collection, and/or (8) the average amount of time needed to copy an object to the survivor space of the garbage collection.

As shown in FIG. 4A, the length of the time window provided by the stop-the-world event may be 200 milliseconds (ms). Additionally, because the stop-the-world event has just started, there is 200 ms of time remaining in the stop-the-world event. At this point, selection apparatus 404 may estimate a number of regions within heap 120 on which garbage collection can be completed (i.e., can be evacuated) within the remaining time. In making the estimation, selection apparatus 404 may use information stored within the results of previous garbage collections as feedback.

The selection apparatus may consider the number of previous successful garbage collections and/or the number of aborted garbage collections recorded during the execution of software program 104. Here, an aborted garbage collection may indicate that past estimates were too high and/or inaccurate and that the selection apparatus 404 should be more conservative in estimating the number of regions that can be processed within the remaining time. On the other hand, a successful garbage collection (especially one with a relatively large amount of time remaining in the associated stop-the-world event) may indicate that past estimates were too low and that less conservative estimates should be made. In some embodiments, the selection apparatus may place more weight on more recent garbage collections. For example, if garbage collector 128 successfully completes ten garbage collections early in software program 104's execution but aborts the last three garbage collections (e.g., because regions may accumulate more objects as the software program executes), the selection apparatus may make a more conservative estimate despite the higher number of successful garbage collections.

The selection apparatus may also consider how long it takes to abort a garbage collection. An average amount of time needed to abort a garbage collection may be calculated using time measurements from previous aborted garbage collections. In some embodiments, when calculating the average, the selection apparatus may give more weight to recent aborted garbage collections. If the average amount of time needed to abort from a garbage collection is high, selection apparatus 404 may make more conservative estimates. On the other hand, if the average amount of time needed to abort from a garbage collection is low, selection apparatus 404 may make less conservative estimates.

In some embodiments, the selection apparatus may also consider a user-settable conservativeness factor, wherein a higher conservative factor would cause the selection apparatus to make more conservative estimates while a lower conservative rating would cause the selection apparatus to prioritize garbage collection throughput. This conservativeness factor may be supplied by the user via a command-line argument and/or a configuration file to software program 104.

In some embodiments, the selection apparatus may consider the amount of free space left in heap 120. In particular, the conservativeness of estimates made by the selection apparatus may be inversely correlated with the amount of free space left in the heap.

In some embodiments, to estimate the number of regions that can be processed within the stop-the-world event's remaining time, the selection apparatus may first determine the average amount of time needed to perform a garbage collection on a single region of heap 120. To do so, the selection apparatus may consider (1) how much garbage is in each region, (2) how many objects needed to be copied out of each region, and (3) how long it takes to copy an object to the survivor space of the garbage collection. For example, the average may be determined by multiplying the average number of objects found in each region by the average amount of time needed to move an object to the survivor space. Once the average amount of time needed to perform a garbage collection on a single region is determined, the selection apparatus may determine the highest number whose product with the average amount of time is less than the remaining time of the stop-the-world event. In some embodiments, the selection apparatus may apply a probability factor to one or more previous estimates to make the current estimate. In some embodiments, the selection apparatus may apply smoothing filters to one or more previous estimates to make the current estimate.

Once the estimated number of regions is obtained, the selection apparatus selects the number of regions from the heap as the collection set. For example, the selection apparatus may estimate that five regions can be processed within 200 ms and then select five regions from heap 120 as the collection set.

Figure 4B:
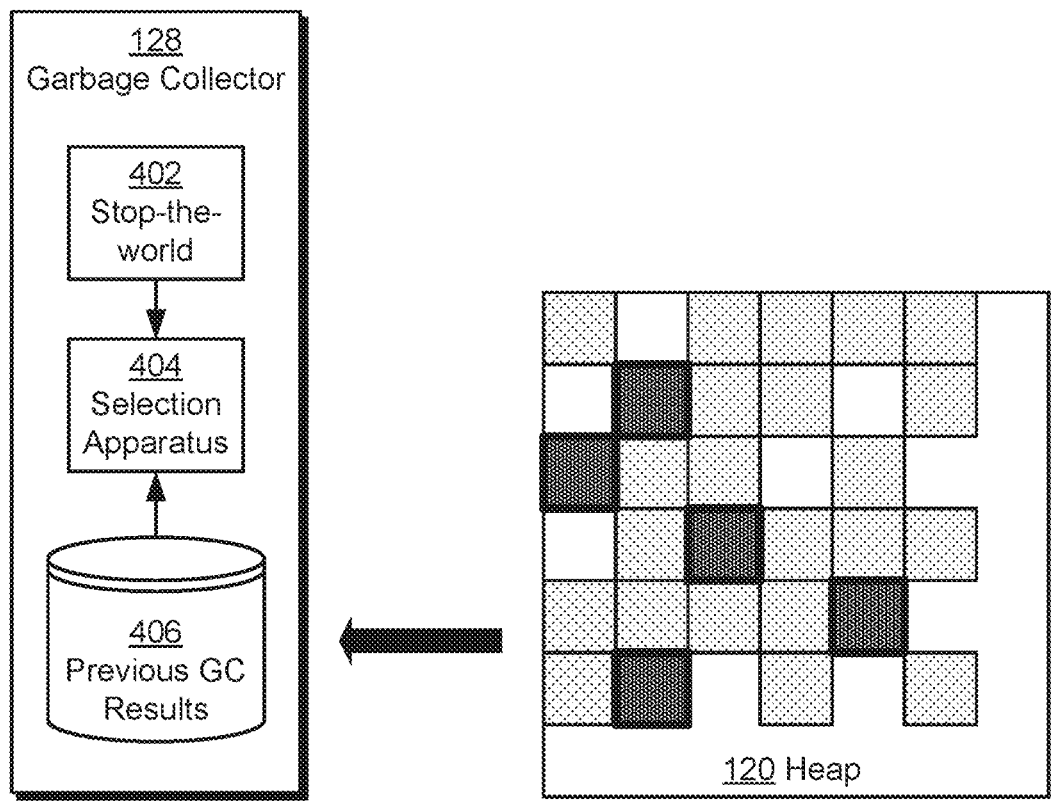
Figure 4B:
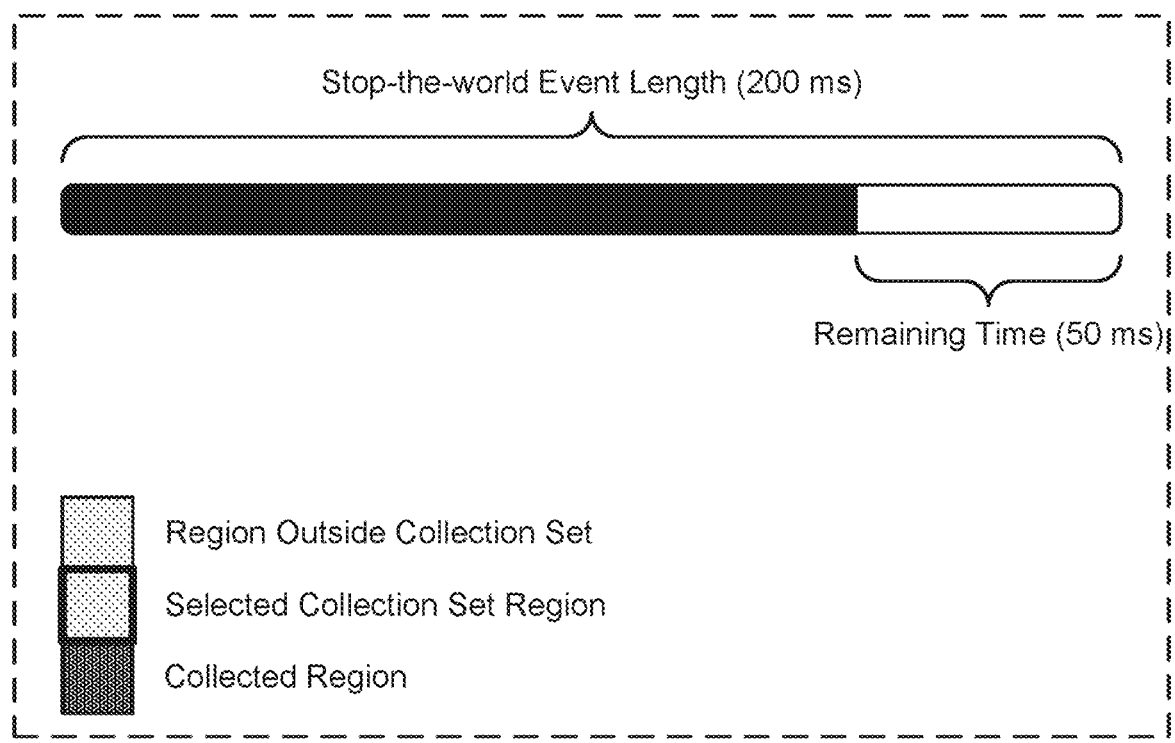

FIG. 4B shows the storing of results from the first garbage collection (i.e., the first evacuation), which was successfully completed during stop-the-world event 402. As shown in FIG. 4B, the five-region collection set has been processed within 150 ms, leaving 50 ms of time remaining in the stop-the-world event. At this point, results of the five-region garbage collection may be stored within previous garbage collection results 406 to be used as feedback for future garbage collections. In particular, results of the five-region garbage collection may include (1) the fact that the garbage collection was completed successfully, (2) the time remaining after the garbage collection was completed, (3) the number of regions collected. (4) the number of objects marked and/or collected per region processed, and (5) the average amount of time used to copy an object to the survivor space of the garbage collection. Additionally, the results of the successful garbage collection may cause selection apparatus 404 to make less conservative estimates during future stop-the-world events.

Figure 4C:
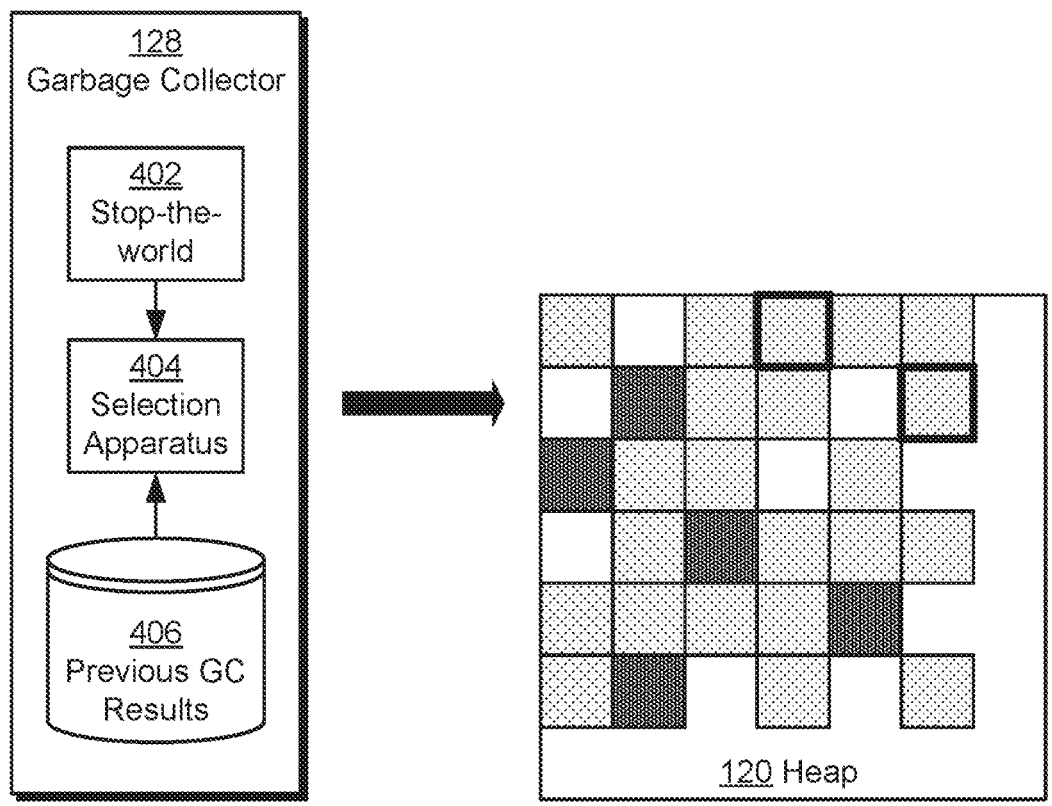
Figure 4C:
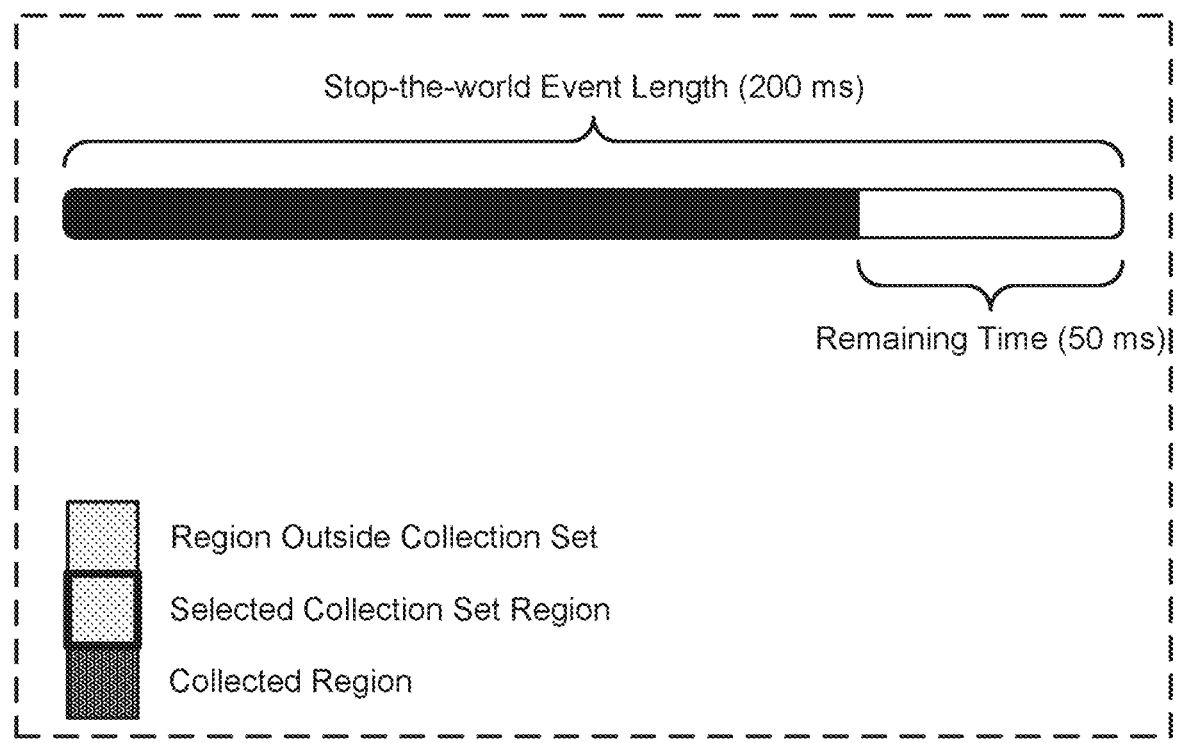

FIG. 4C shows an attempt to perform a second (smaller) garbage collection in response to a first check performed during stop-the-world event 402. During the check, if garbage collector 128 determines that there is still time remaining within a stop-the-world event after the first garbage collection is performed, it may attempt to perform an additional garbage collection (i.e., a second evacuation) within the remaining time to increase garbage collection throughput.

In particular, selection apparatus 404 may estimate that two more regions can be processed within the remaining 50 ms of the stop-the-world event and select two regions (as shown by the two more heavily bordered squares in heap 120) as a second collection set to be processed within the stop-the-world event. The second estimate may be obtained using the same algorithms and/or heuristics that were used to calculate the first estimate of FIG. 4A. Additionally, while making the second estimate, selection apparatus 404 may use: (1) the results of the five-region garbage collection; and (2) other results stored prior to the five-region garbage collection as feedback.

Figure 4D:
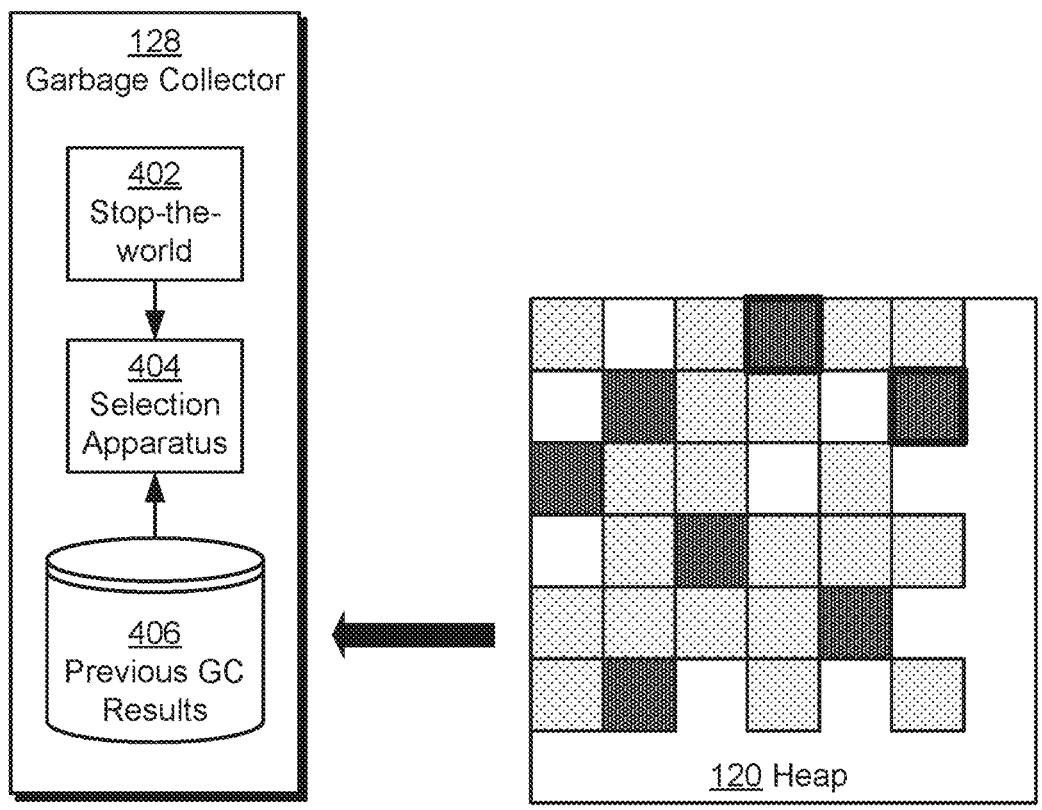
Figure 4D:
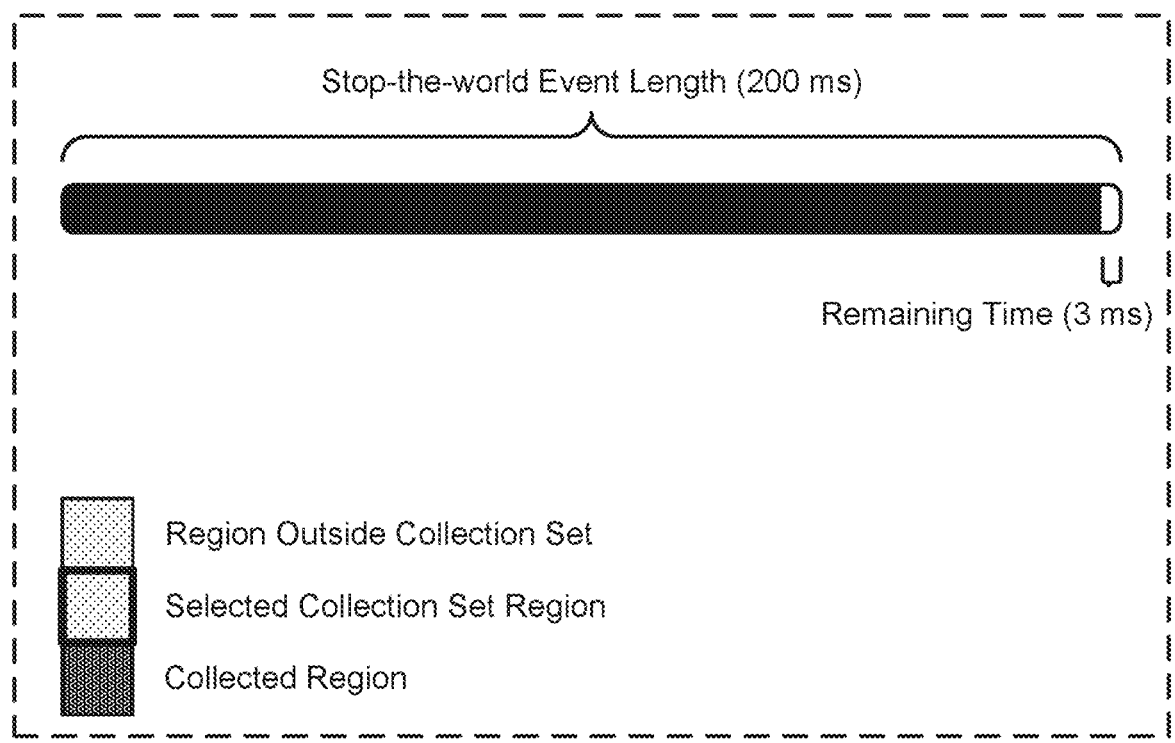

FIG. 4D shows the storing of results from the second garbage collection (i.e., the second evacuation) that is successfully completed during stop-the-world event 402. As shown in FIG. 4D, the two-region collection set has been processed within 47 ms, leaving 3 ms of time remaining within the stop-the-world event. Here, the results of the two-region garbage collection may be stored within previous garbage collection results 406 to be used as feedback for future garbage collections. In particular, results of the two-region garbage collection may include similar information included in the results of the five-region garbage collection. Additionally, the results from the successful garbage collection may cause selection apparatus 404 to make less conservative estimates during future stop-the-world events.

At this point, because there is only 3 ms of remaining time left in stop-the-world even 402, selection apparatus 404 may determine that there is not enough time to process another region of the heap. As a result, garbage collector 128 may forgo attempting to garbage collect any more regions until the next stop-the-world event arrives. Once the remaining time runs out, software program 104 resumes execution while threads of garbage collector 128 are halted until the next stop-the-world event. In some embodiments, rather than wait for the 3 ms to run out, garbage collector 128 may prematurely end stop-the-world event 402, thereby allowing software program 104 to resume earlier.

Figure 4E:
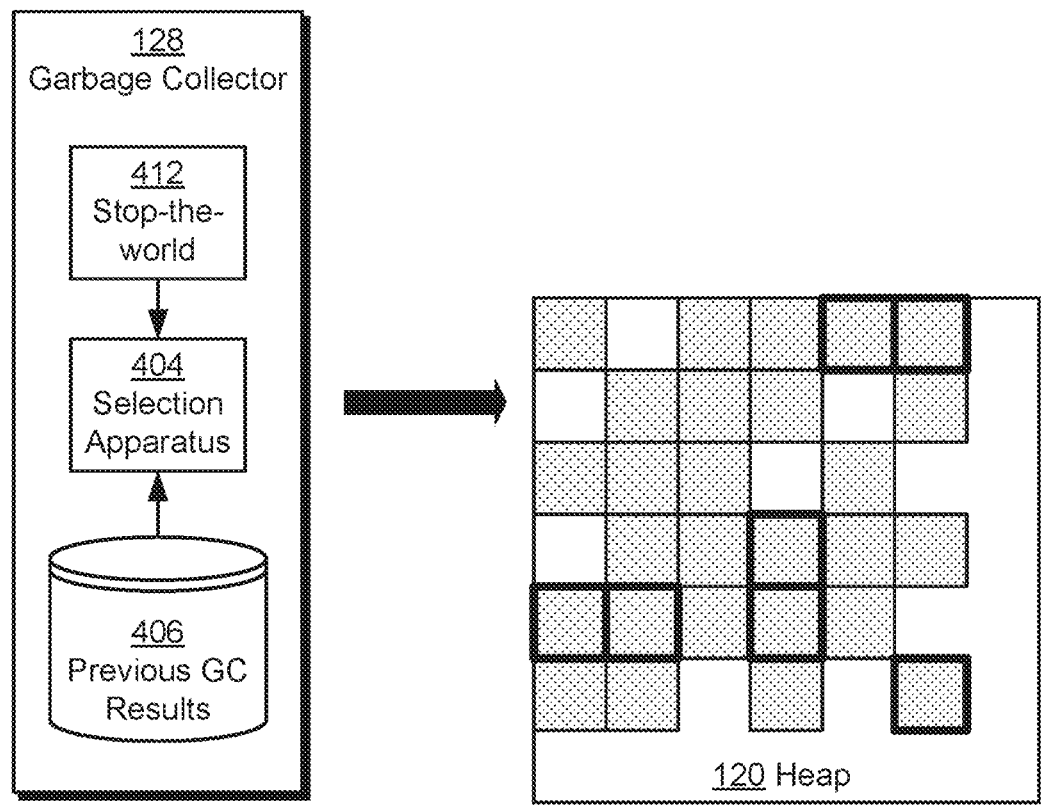
Figure 4E:

FIG. 4E shows an attempt to perform the first garbage collection during a subsequent stop-the-world event (stop-the-world event 412). Here, selection apparatus 404 may estimate the highest number of regions on which garbage collection can be completed within stop-the-world event 412, which is also 200 ms long. In doing so, however, the selection apparatus may use (1) results of the two-region garbage collection stored in FIG. 4D, (2) results of the five-region garbage collection stored in FIG. 4B, and (3) other results stored prior to the five-region garbage collection as feedback. In particular, selection apparatus 404 may consider that a total of seven regions were successfully processed within 200 ms during stop-the-world event 412. While this is no guarantee that garbage collector 128 can process a single seven-region collection set within the 200 ms time window (because certain regions may contain more and/or larger objects to mark and/or copy), selection apparatus 404 may estimate that seven regions can be collected within stop-the-world event 412. The selection apparatus may then select a seven-region collection set for the next garbage collection attempt.

Figure 4F:
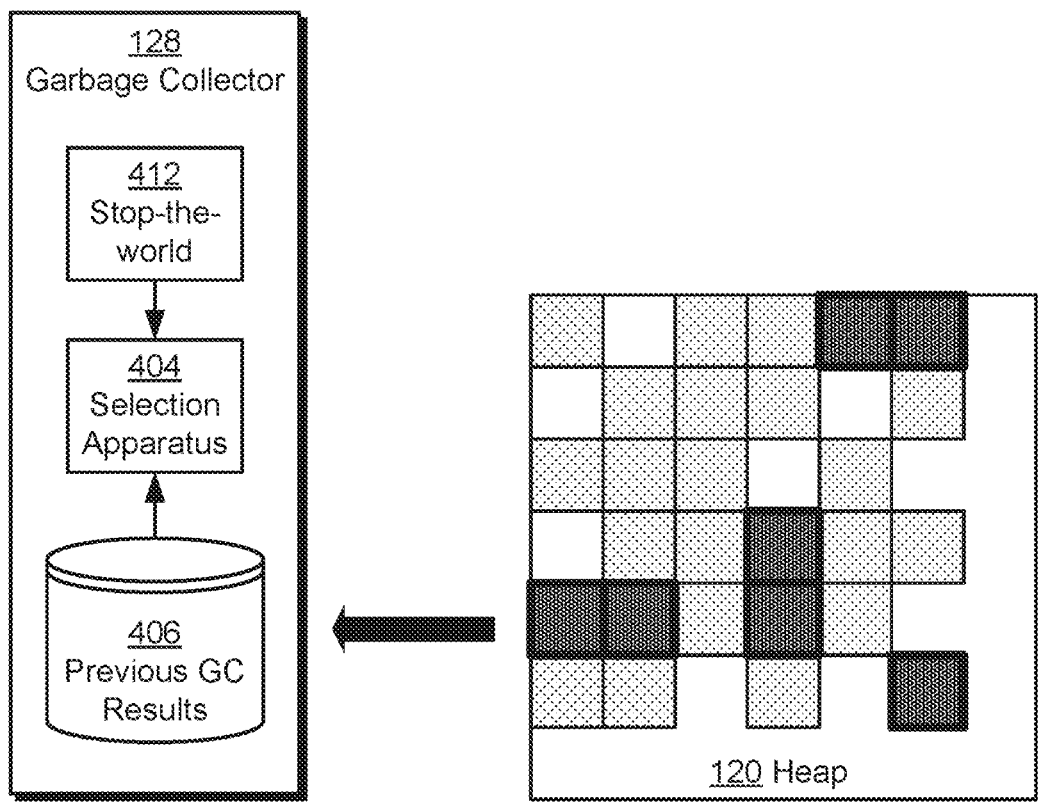
Figure 4F:
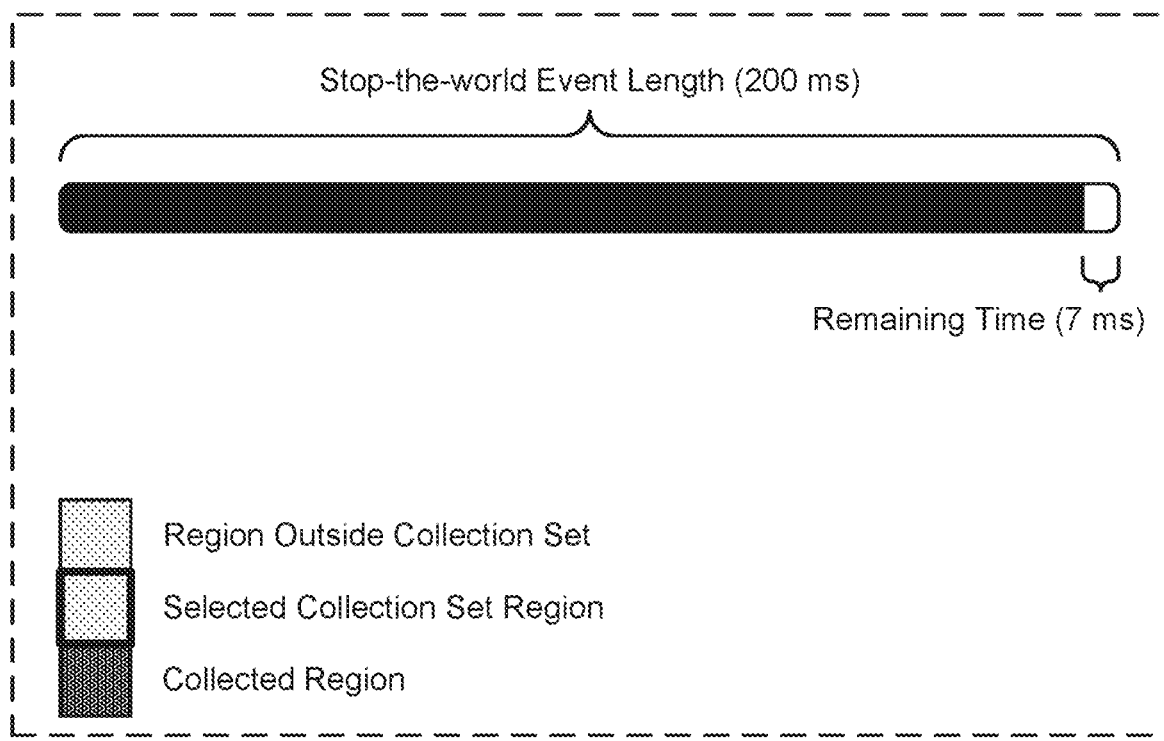

FIG. 4F shows the storing of results from the first garbage collection that is successfully completed during stop-the-world event 412. As shown in FIG. 4F, the seven-region collection set has been collected within 193 ms. Additionally, because there is only 7 ms remaining within stop-the-world event 412, selection apparatus 404 may determine that there is not enough time to attempt a second garbage collection during the stop-the-world event. As a result, garbage collector 128 may not attempt to garbage collect any more regions until the next stop-the-world event arrives. Once the remaining time runs out, software program 104 resumes execution while the threads of garbage collector 128 are halted until the next stop-the-world event.

It should be noted that the first garbage collection (where five regions are evacuated) and the additional garbage collection (where two additional regions are evacuated) mentioned in FIGS. 4A-4D may be referred to as a first evacuation phase and a second evacuation phase respectively, wherein the two evacuation phases are part of a single garbage collection illustrated in FIGS. 4A-4D. In particular, the garbage collection illustrated in FIGS. 4A-4D contains two evacuation phases (the first evacuation phase shown in FIGS. 4A-4B and the second evacuation phase shown in FIGS. 4C-4D) because there was enough time after the first evacuation phase to perform a second smaller evacuation (i.e., the additional garbage collection). In contrast, the garbage collection depicted in FIGS. 4E-4F may contain only a single evacuation phase. Here, the phrase "garbage collection" has been used to refer to both evacuation phases, which are performed within a time window (which may be a portion of a stop-the-world event), and garbage collections, which may contain multiple evacuations phases and are performed within a complete stop-the-world event.

Figure 5A:
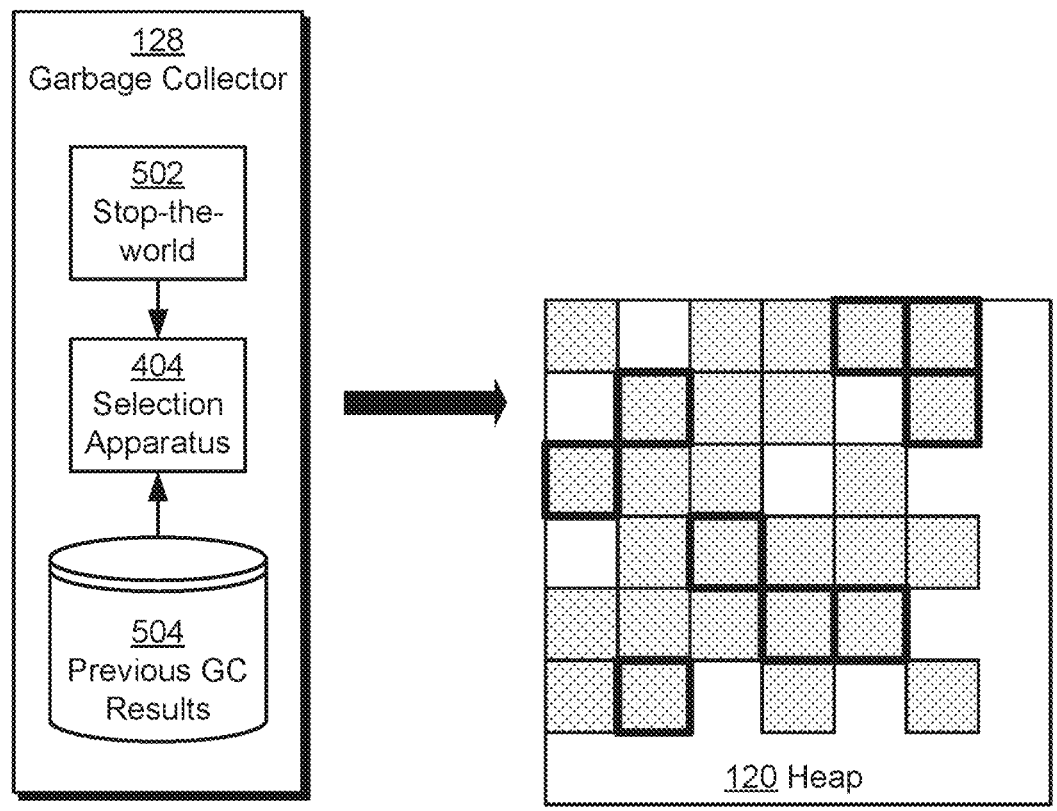
FIGS. 5A-5B show an aborted garbage collection attempt in accordance with the disclosed embodiments.
Figure 5A:
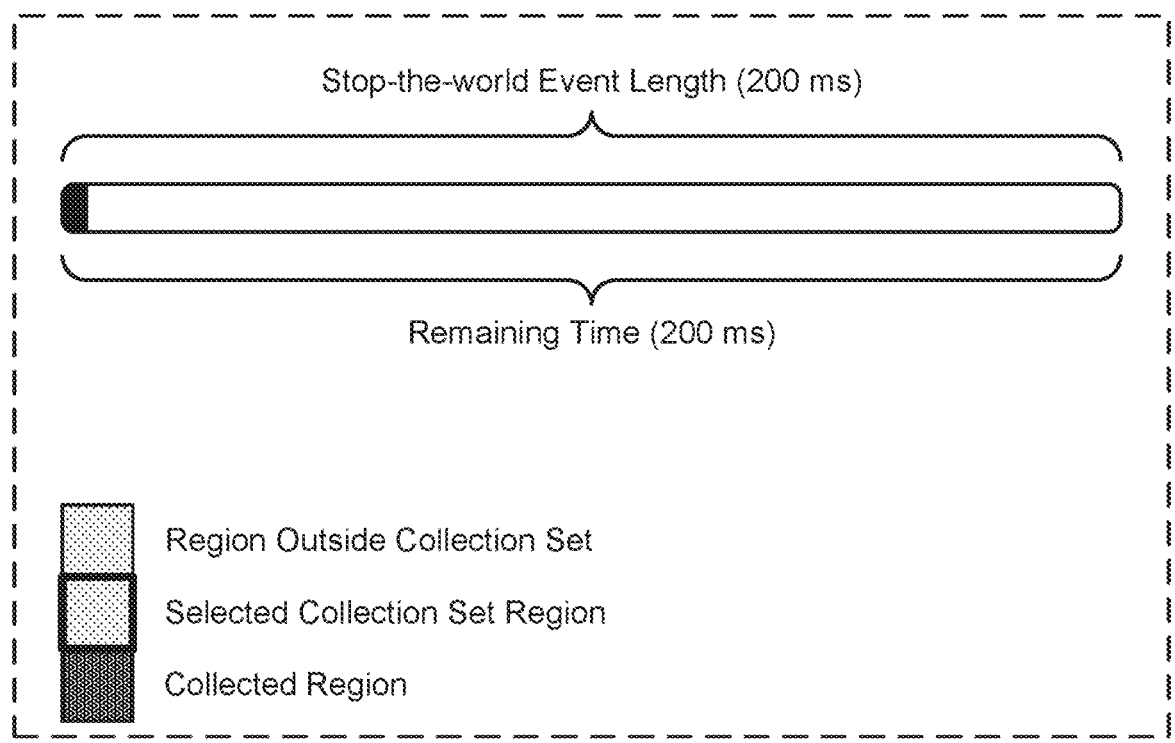
Figure 5B:
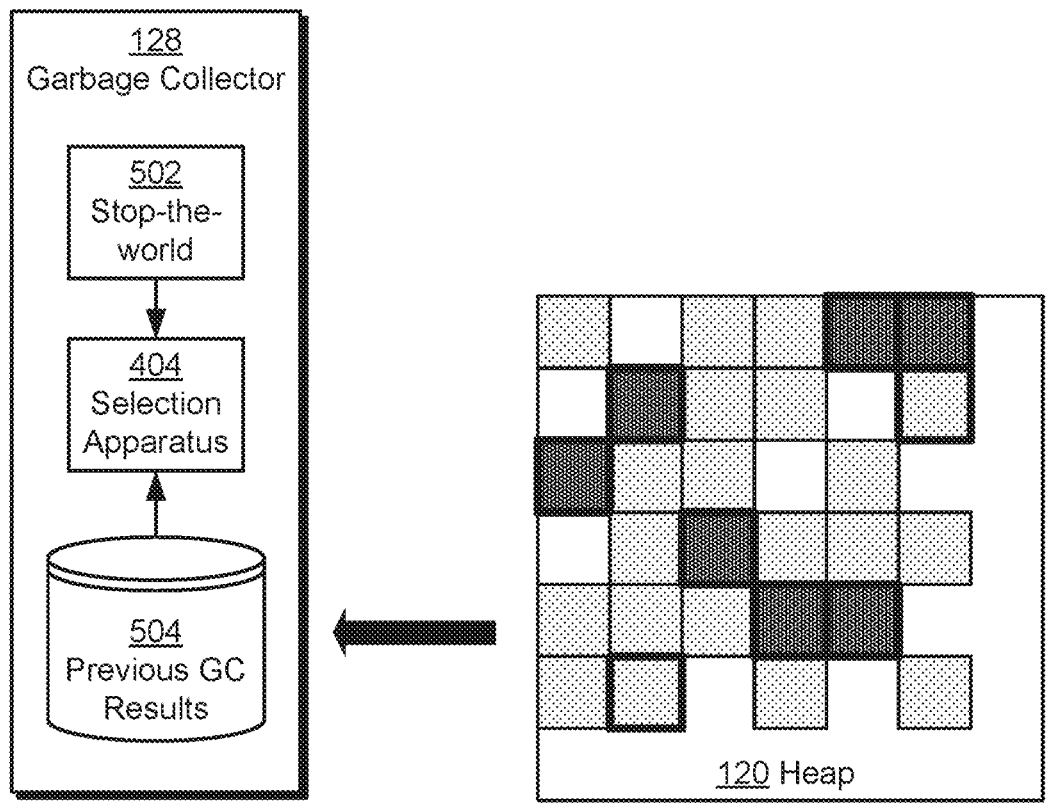
Figure 5B:
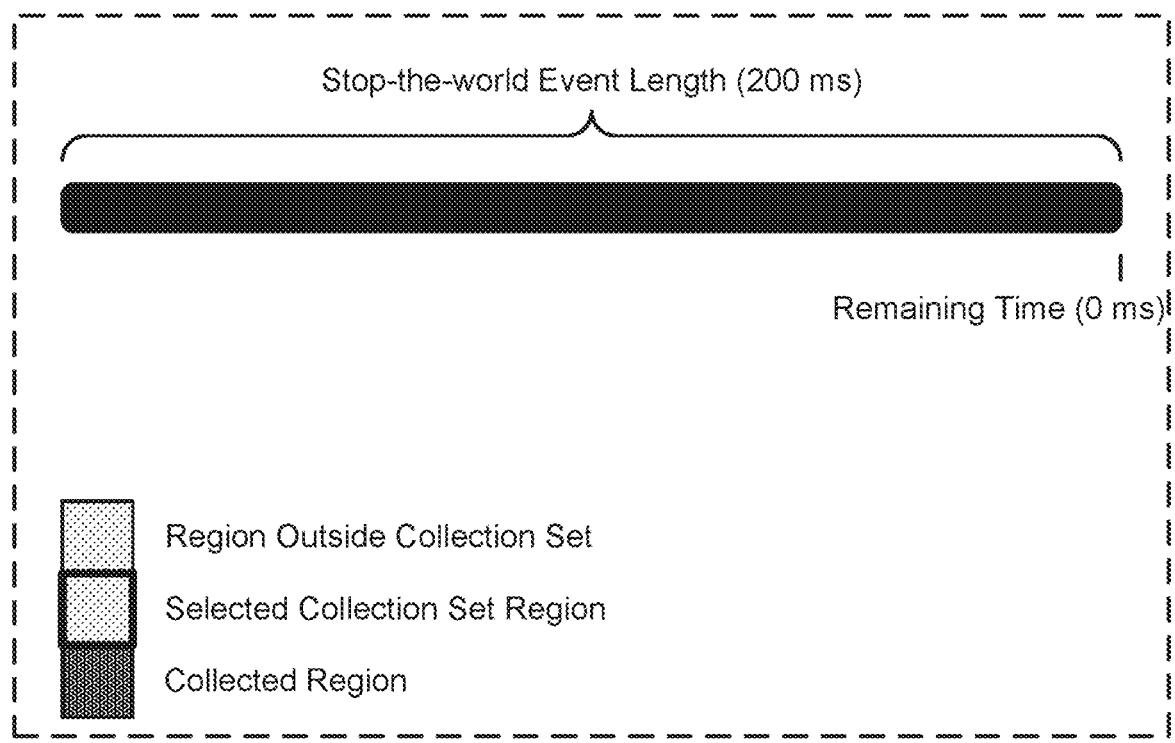

FIGS. 5A-5B show an aborted garbage collection attempt in accordance with the disclosed embodiments. More specifically FIGS. 5A-5B illustrate a number of interactions between a garbage collector and the heap while the garbage collector attempts to collect an overly large collection set from the heap during a stop-the-world event.

FIG. 5A shows an attempt to perform a garbage collection during stop-the-world event 502. Here, selection apparatus 404 may estimate the highest number of regions on which garbage collection can be completed within stop-the-world event 502, which is also 200 ms long. When selection apparatus 404 estimates how many regions should be collected within 200 ms, it may obtain feedback from previous garbage collections stored in previous garbage collection results 504. Here, selection apparatus 404 estimates that nine regions can be processed within 200 ms. As a result, the selection apparatus selects a nine-region collection set for processing.

FIG. 5B shows the storing of results from a garbage collection that is aborted during stop-the-world event 502. As shown in heap 120, only seven regions of the nine-region collection set have been processed. Because there is no time left in stop-the-world event 502 for processing the last two selected regions, garbage collector 128 may abort this garbage collection. In some embodiments, garbage collector 128 may need to roll back any operations performed (e.g., restoring collected objects, deleting copied objects, etc.) on at least one of the seven processed regions to preserve the integrity of software program 104's state. In other embodiments, garbage collector 128 may not need to roll back any operations. In this case, the seven regions may be considered processed. It should also be noted that in some embodiments, garbage collector 128 may abort a garbage collection even if there is time left but not enough time to perform a meaningful amount of work (e.g., 3-4 ms).

Additionally, results of the aborted garbage collection attempt may be stored within previous garbage collection results 504 to be used as feedback for future garbage collections. In particular, results of the aborted garbage collection attempt may include (1) the fact that the garbage collection was aborted, (2) the amount of time used to abort the garbage collection attempt, (3) the number of regions collected, (4) the number of regions selected, (5) the number of objects marked and/or collected per region processed, and (6) the average amount of time used to copy an object to the survivor space of the garbage collection. Additionally, the results from the aborted garbage collection attempt may cause selection apparatus 404 to make more conservative estimates during future stop-the-world events.

Figure 6:
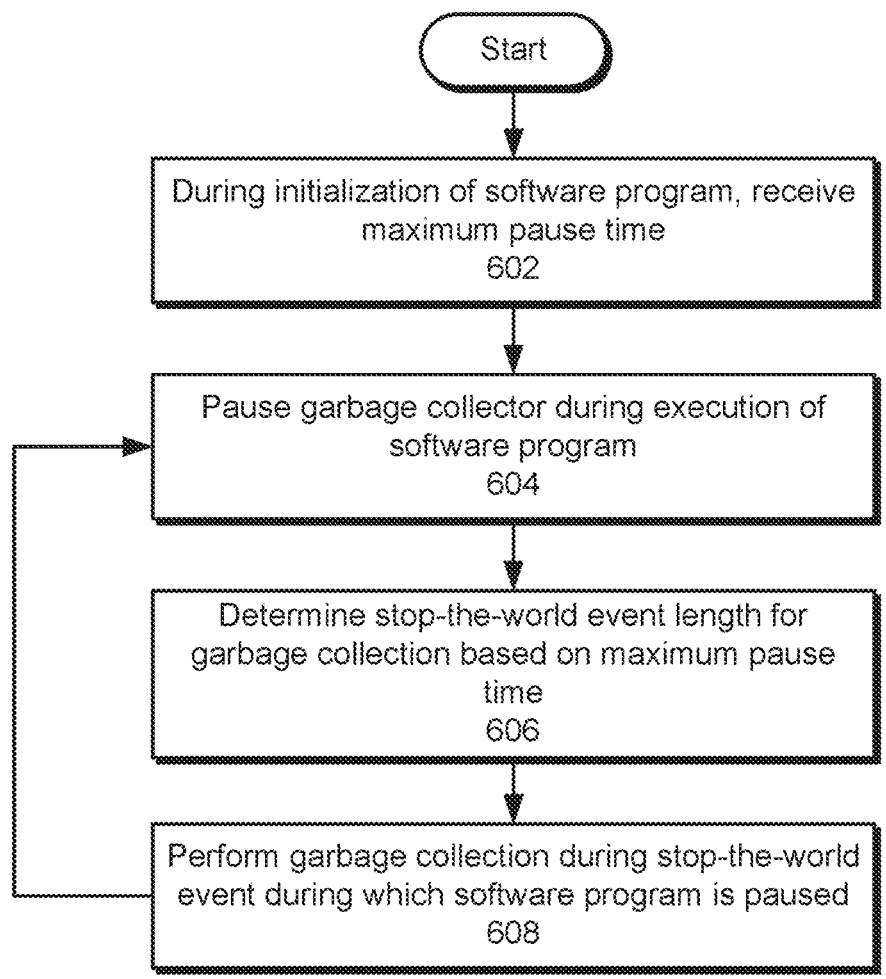
FIG. 6 shows a flowchart illustrating an exemplary process of garbage collection in accordance with the disclosed embodiments.

FIG. 6 shows a flowchart illustrating an exemplary process of garbage collection in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

During the initialization of a software program, the garbage collector provided by the host environment in which the software program executes receives a maximum pause time (operation 602). In some embodiments, the maximum pause time may be received from a user of the software program via a command line argument and/or a configuration file that is associated with the software program. In general, the host environment may try to ensure that garbage collection efforts do not interrupt the execution of the software program for a time period longer than the maximum pause time. In other words, stop-the-world events that are imposed on the software program and time windows during which garbage collections may be attempted and/or completed may be less than or equal to the maximum pause time. In some embodiments, however, for particularly intensive garbage collections (e.g., old/mixed garbage collections), stop-the-world events and time windows that are longer than the maximum pause time may be imposed. During the execution of the software program, one or more threads of the garbage collector may be paused (operation 604). When the amount of free space within a heap that is used by the software program falls below a particular threshold, a garbage collection event may be triggered. Next, the length of a stop-the-world event may be dynamically determined based on the maximum pause time (operation 606). In most cases, the length of stop-the-world event will be either equal to or shorter than the maximum pause time. In some embodiments, the length of all stop-the-world events may be a static value that is set, based on the maximum pause time, at the beginning of the software program's execution. The stop-the-world event is then imposed on the software program. During the stop-the-world event, the garbage collector performs garbage collection on the heap while the software program's threads are paused (operation 608).

Figure 7:
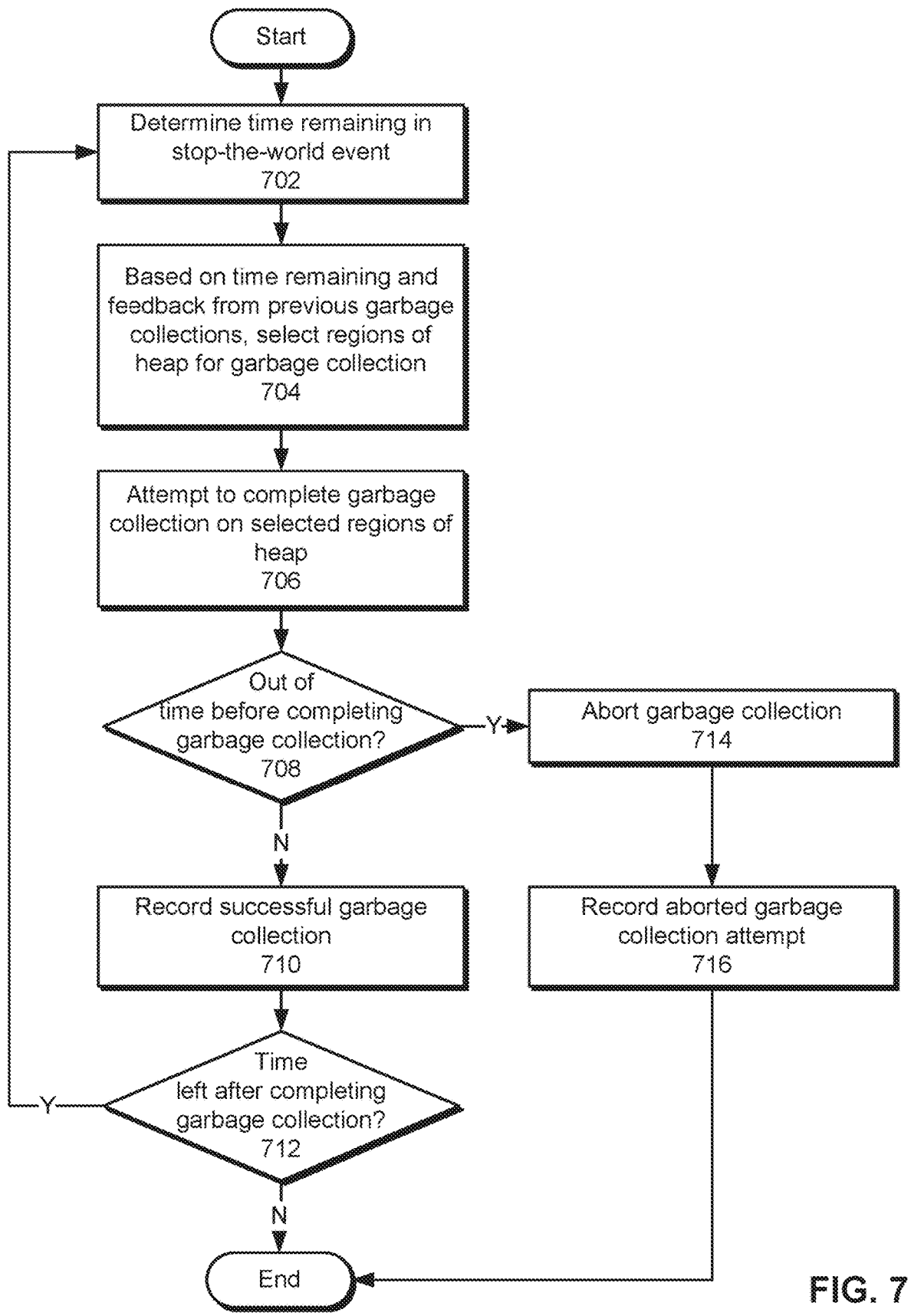
FIG. 7 shows a flowchart illustrating an exemplary process of selecting regions for garbage collection based on feedback in accordance with the disclosed embodiments.

FIG. 7 shows a flowchart illustrating an exemplary process of selecting regions for garbage collection based on feedback in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

During the stop-the-world event, the garbage collector may first determine the length of the stop-the-world event (operation 702). Next, based on the length of the stop-the-world event and feedback from previous garbage collections, the garbage collector may estimate a number of regions of the heap on which garbage collection can be completed and select that number of regions of the heap for garbage collection (operation 704). The garbage collector may then attempt to complete garbage collection on the selected regions of the heap within the stop-the-world event (operation 706). If the garbage collector runs out of time before it can finish processing the selected regions (decision 708), the garbage collector may abort the garbage collection (operation 714) and record the aborted garbage collection attempt (operation 716), which may later be used as feedback for future garbage collections. On the other hand, if the garbage collector is able to finish processing the selected regions within the stop-the-world event (decision 708), the garbage collector may record the successful garbage collection (operation 710), which may later be used as feedback for future garbage collections. Next, the garbage collector may determine whether there is enough time left within the stop-the-world event to attempt another garbage collection (decision 712). If so, the garbage collector may attempt another garbage collection within the remaining time (operations 702-706). Once the stop-the-world event ends, the software program resumes execution while the garbage collector's threads are halted until the next stop-the-world event.

Figure 8:
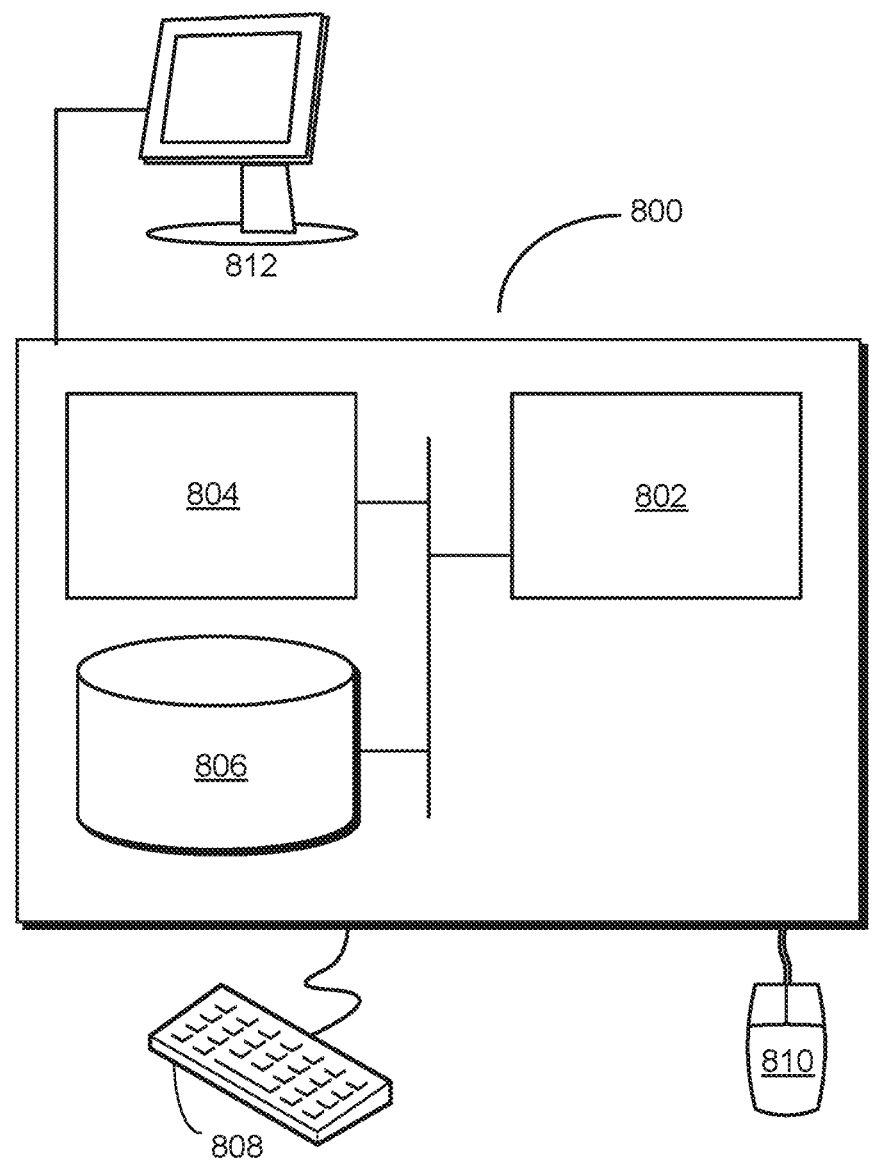
FIG. 8 shows a computer system in accordance with the disclosed embodiments.

FIG. 8 shows a computer system 800 in accordance with an embodiment. Computer system 800 may correspond to an apparatus that includes a processor 802, memory 804, storage 806, and/or other components found in electronic computing devices such as personal computers, laptop computers, workstations, servers, mobile phones, tablet computers, and/or portable media players. Processor 802 may support parallel processing and/or multi-threaded operation with other processors in computer system 800. Computer system 800 may also include input/output (I/O) devices such as a keyboard 808, a mouse 810, and a display 812.

Computer system 800 may include functionality to execute various components of the present embodiments. In particular, computer system 800 may include an operating system (not shown) that coordinates the use of hardware and software resources on computer system 800, as well as one or more applications that perform specialized tasks for the user. To perform tasks for the user, applications may obtain the use of hardware resources on computer system 800 from the operating system, as well as interact with the user through a hardware and/or software linker provided by the operating system.

In one or more embodiments, computer system 800 provides an incremental and abortable garbage collection mechanism that uses feedback from previous garbage collections to estimate a portion of a referenced memory area on which garbage collection can be completed within a stop-the-world event, wherein the garbage collection mechanism attempts to process the estimated portion within the stop-the-world event.

In addition, one or more components of computer system 800 may be remotely located and connected to the other components over a network. Portions of the present embodiments (e.g., storage apparatus, extraction apparatus, etc.) may also be located on different nodes of a distributed system that implements the embodiments. For example, the present embodiments may be implemented using a cloud computing system that improves the knowledge and management of memory consumption in a set of remote software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. One or more non-transitory machine-readable media storing instructions which, when executed by one or more processors, cause:
    garbage collecting a first portion of a memory area used by a software program, during a first time window in which the software program is paused for garbage collection of the memory area;
    subsequent to garbage collecting the first portion of the memory area and before completion of the first time window: determining a first remaining amount of time left in the first time window;
    estimating that a time required to perform garbage collection of a second portion of the memory area is less than or equal to the first remaining amount of time;
    based at least on estimating that the time required to perform garbage collection of the second portion of the memory area is less than or equal to the first remaining amount of time: initiating garbage collection of the second portion of the memory area before completion of the first time window;
    garbage collecting a third portion of the memory area used by the software program, during a second time window in which the software program is paused for garbage collection of the memory area;
    subsequent to garbage collecting the third portion of the memory area and before completion of the second time window: determining a second remaining amount of time left in the second time window;
    estimating that a time required to perform garbage collection of a fourth portion of the memory area exceeds the second remaining amount of time;
    based at least on estimating that the time required to perform garbage collection of the fourth portion of the memory area exceeds the second remaining amount of time: refraining from initiating garbage collection of the fourth portion of the memory area during the second time window.

2. The one or more media of claim 1, further storing instructions which, when executed by one or more processors, cause:
    subsequent to garbage collecting the second portion of the memory area and before completion of the first time window: determining a third remaining amount of time left in the first time window;
    estimating that a time required to perform garbage collection of a fifth portion of the memory area is less than or equal to the third remaining amount of time;
    based at least on estimating that the time required to perform garbage collection of the fifth portion of the memory area is less than or equal to the third remaining amount of time: initiating garbage collection of the fifth portion of the memory area before completion of the first time window.

3. The one or more media of claim 1, further storing instructions which, when executed by one or more processors, cause:
    based at least on estimating that a time required to perform garbage collection of the fourth portion of the memory area exceeds the second remaining amount of time: estimating that a time required to perform garbage collection of a fifth portion of the memory area that is smaller than the fourth portion of the memory area is less than, or equal to, the second remaining amount of time;
    based at least on estimating that the time required to perform garbage collection of the fifth portion of the memory area is less than, or equal to, the second remaining amount of time: initiating garbage collection of the fifth portion of the memory area before completion of the second time window.

4. The one or more media of claim 1, further storing instructions which, when executed by one or more processors, cause:
    based at least on estimating that a time required to perform garbage collection of the fourth portion of the memory area exceeds the second remaining amount of time: terminating garbage collection of the memory area before completion of the second time window.

5. The one or more media of claim 4, further storing instructions which, when executed by one or more processors, cause:
    resuming operation of the software program before completion of the second time window.

6. The one or more media of claim 1, wherein the time required to perform garbage collection of the second portion of the memory area is estimated based on a number of memory regions of the second portion of the memory area that are garbage collected in the first remaining amount of time.

7. The one or more media of claim 6, wherein estimating the number of memory regions that are garbage collected in the first remaining amount of time comprises determining an average amount of time to garbage collect a single memory region.

8. The one or more media of claim 7, wherein determining the average amount of time to garbage collect the single memory region comprises multiplying an average number of objects found in memory regions by an average amount of time to move objects to a survivor space.

9. The one or more media of claim 1, wherein estimating that the time required to perform garbage collection of the second portion of the memory area is less than, or equal to, the first remaining amount of time is based at least in part on information associated with garbage collecting the first portion of the memory area.

10. The one or more media of claim 9, wherein the information associated with garbage collecting the first portion of the memory area comprises a number of objects collected from the first portion of a memory area.

11. The one or more media of claim 9, wherein the information associated with garbage collecting the first portion of the memory area comprises an average amount of time taken to copy objects from the first portion of a memory area to a survivor area.

12. The one or more media of claim 1, wherein estimating that the time required to perform garbage collection of the second portion of the memory area is less than, or equal to, the first remaining amount of time is based at least in part on information associated with a garbage collection attempted before the first time window began.

13. The one or more media of claim 12, wherein the information associated with the garbage collection attempted before the first time window began comprises an amount of time taken to abort the garbage collection.

14. The one or more media of claim 12, wherein the information associated with the garbage collection attempted before the first time window began comprises an amount of time taken to complete the garbage collection.

15. The one or more media of claim 12, wherein the information associated with the garbage collection attempted before the first time window began comprises a number of objects collected during the garbage collection.

16. The one or more media of claim 9, wherein the information associated with the garbage collection attempted before the first time window began comprises an average amount of time taken to copy objects to a survivor area during the garbage collection.

17. A system comprising:
at least one device including a hardware processor;
the system being configured to perform operations comprising:
garbage collecting a first portion of a memory area used by a software program, during a first time window in which the software program is paused for garbage collection of the memory area;
subsequent to garbage collecting the first portion of the memory area and before completion of the first time window: determining a first remaining amount of time left in the first time window;
estimating that a time required to perform garbage collection of a second portion of the memory area is less than or equal to the first remaining amount of time;
based at least on estimating that the time required to perform garbage collection of the second portion of the memory area is less than or equal to the first remaining amount of time: initiating garbage collection of the second portion of the memory area before completion of the first time window;
garbage collecting a third portion of the memory area used by the software program, during a second time window in which the software program is paused for garbage collection of the memory area;
subsequent to garbage collecting the third portion of the memory area and before completion of the second time window: determining a second remaining amount of time left in the second time window;
estimating that a time required to perform garbage collection of a fourth portion of the memory area exceeds the second remaining amount of time;
based at least on estimating that the time required to perform garbage collection of the fourth portion of the memory area exceeds the second remaining amount of time: refraining from initiating garbage collection of the fourth portion of the memory area during the second time window.

18. A method comprising:
garbage collecting a first portion of a memory area used by a software program, during a first time window in which the software program is paused for garbage collection of the memory area;
subsequent to garbage collecting the first portion of the memory area and before completion of the first time window: determining a first remaining amount of time left in the first time window;
estimating that a time required to perform garbage collection of a second portion of the memory area is less than or equal to the first remaining amount of time;
based at least on estimating that the time required to perform garbage collection of the second portion of the memory area is less than or equal to the first remaining amount of time: initiating garbage collection of the second portion of the memory area before completion of the first time window;
garbage collecting a third portion of the memory area used by the software program, during a second time window in which the software program is paused for garbage collection of the memory area;
subsequent to garbage collecting the third portion of the memory area and before completion of the second time window: determining a second remaining amount of time left in the second time window;
estimating that a time required to perform garbage collection of a fourth portion of the memory area exceeds the second remaining amount of time;
based at least on estimating that the time required to perform garbage collection of the fourth portion of the memory area exceeds the second remaining amount of time: refraining from initiating garbage collection of the fourth portion of the memory area during the second time window.

19. One or more non-transitory machine-readable media storing instructions which, when executed by one or more processors, cause:
garbage collecting a first portion of a memory area used by a software program, during a first time window in which the software program is paused for garbage collection of the memory area;
subsequent to garbage collecting the first portion of the memory area and before completion of the first time window: determining a first remaining amount of time left in the first time window;
estimating that a time required to perform garbage collection of a second portion of the memory area is less than or equal to the first remaining amount of time;

based at least on estimating that the time required to perform garbage collection of the second portion of the memory area is less than or equal to the first remaining amount of time: initiating garbage collection of the second portion of the memory area before completion of the first time window;

failing to complete garbage collection of the second portion of the memory area before completion of the first time window;

responsive to failing to complete garbage collection of the second portion of the memory area before completion of the first time window: storing information corresponding to an aborted garbage collection;

based at least on the information corresponding to the aborted garbage collection, estimating how much memory is garbage collected in a second time window.

20. One or more non-transitory machine-readable media storing instructions which, when executed by one or more processors, cause:

garbage collecting a first portion of a memory area used by a software program, during a first time window in which the software program is paused for garbage collection of the memory area;

subsequent to garbage collecting the first portion of the memory area and before completion of the first time window: determining a first remaining amount of time left in the first time window;

estimating that a time required to perform garbage collection of a second portion of the memory area is less than or equal to the first remaining amount of time;

based at least on estimating that the time required to perform garbage collection of the second portion of the memory area is less than, or equal to, the first remaining amount of time: initiating garbage collection of the second portion of the memory area before completion of the first time window, wherein estimating that the time required to perform garbage collection of the second portion of the memory area is less than, or equal to, the first remaining amount of time is based at least in part on information associated with garbage collecting the first portion of the memory area.

\* \* \* \* \*

UNITED STATES PATENT AND TRADEMARK OFFICE
CERTIFICATE OF CORRECTION

PATENT NO. : 11,294,806 B2
APPLICATION NO. : 16/526212
DATED : April 5, 2022
INVENTOR(S) : Schatzl et al.

It is certified that error appears in the above-identified patent and that said Letters Patent is hereby corrected as shown below:

In the Specification

In Column 4, Line 16, delete "incremental." and insert -- incremental, --, therefor.

In Column 7, Line 67, delete "specifically." and insert -- specifically, --, therefor.

In Column 9, Line 55, delete "collection." and insert -- collection, --, therefor.

In Column 11, Line 26, delete "collected." and insert -- collected, --, therefor.

Signed and Sealed this
Sixteenth Day of August, 2022

Katherine Kelly Vidal
*Director of the United States Patent and Trademark Office*